1 Sheet
Sheet 1

C. H. McCormick.

Mower.

Reissued May 24, 1853.
Reissued Dec. 21, 1858.
Reissued Sep. 20, 1859.

No 816

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 816, dated September 20, 1859.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
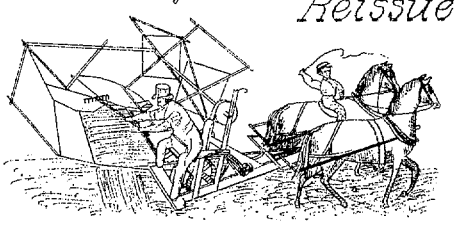
Figure 2:
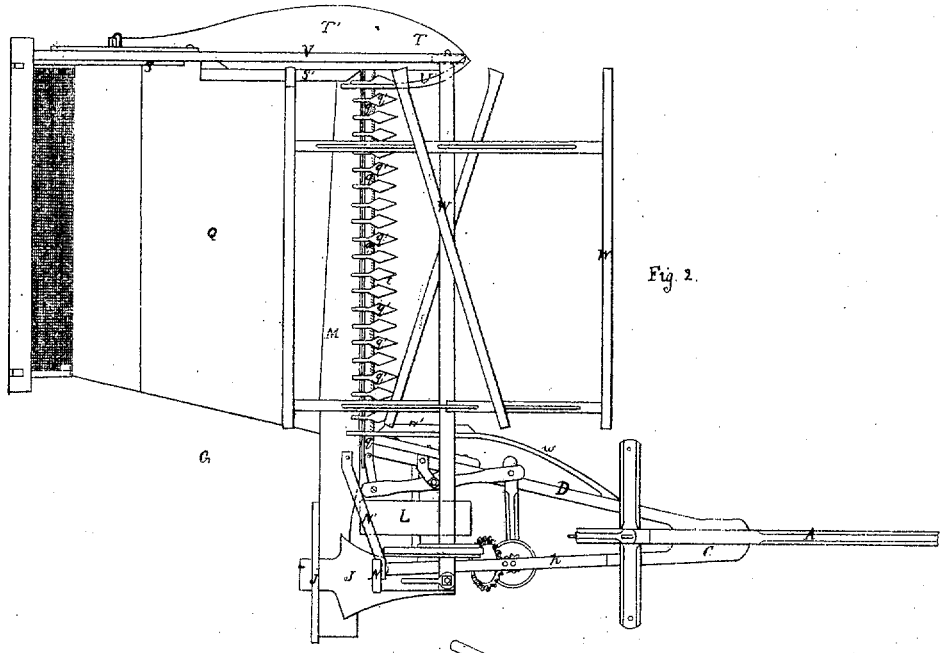
Figure 3:
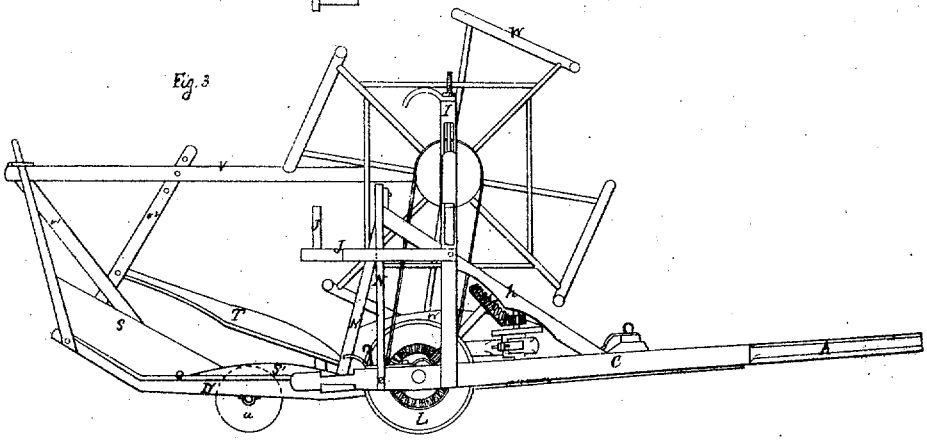

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a plan of the under side of the machine.

That side of the machine to which the horses are attached, and which runs next the stubble, I call the "inner" side, and the opposite side of the machine, which runs next the uncut grain, I call the "outer" side of the machine.

My invention has for its object the balancing of a reaping-machine in such manner that it may oscillate easily upward and downward on a transverse axis of oscillation, and at the same time be nearly balanced thereon when the weight of the raker is supported on a seat or stand in the rear of that axis; and my invention consists in so arranging the parts of the machine on its supporting-wheels that the greater part of the weight of the cutting apparatus and reel shall be forward of the axis of oscillation, while the raker's seat or its equivalent shall be placed in the rear of that axis, and the machine with the raker thereon nearly balanced on its axis of oscillation. By "axis of oscillation" I mean a line passing through the centers of the driving-wheel and the grain-wheel, or holding substantially that position, and on which axis the machine turns when oscillating up and down upon the wheels.

In the drawings I have shown this improvement applied to a McCormick reaping-machine, but deem it unnecessary to describe in detail any more of that machine than is needful to a proper understanding of this improvement.

The machine represented in the accompanying drawings is constructed with a platform, Q, in the rear and a cutter, *q*, and guard-fingers *q'* in front of the outer portion of the finger-beam M, and with gearing and a driving-wheel, L, in front of the inner portion of the finger-beam. A reel, W, is supported above the cutter. The draft of the machine is from the front of the inner side of the frame, from which a tongue, A, for the horses to draw by, projects forward in the usual manner. The outer side of the platform is supported by a small wheel. *u*, (shown in Figs. 3 and 6,) which, being nearest the standing grain, is called the "grain-wheel," placed behind the divider. The seat or stand J for the raker is placed in rear of the axis of oscillation, where he will balance the machine, and can readily reach the grain to be raked off.

The above-specified parts of the machine having been located and arranged as described, the axis of the main driving-wheel is to be placed in the frame, so that the machine carrying the raker shall be nearly balanced thereon, and may oscillate on an axis passing through the center of the driving-wheel L and that of the grain-wheel *u*, or other equivalent support for the outer side of the machine. The seat J for the raker being in rear of the axis of oscillation, while the center of weight of the cutting apparatus and reel is in front of that axis, the equilibrium of the machine is easily maintained. Practically, I prefer to allow the weight of the machine to preponderate a little in front of the axis of oscillation, in order to make the machine run more steadily.

What I claim under this patent as my invention is—

The arrangement, substantially as described, of a cutting apparatus and a reel with respect to a driving-wheel and a grain-wheel or its equivalent, and a raker's seat or its equivalent, so that the major part of the weight of the cutting apparatus and reel shall be in advance of the axis of oscillation of the machine on the said wheels, while the raker's seat or stand shall be located behind that axis and the machine with the raker thereon nearly balanced on its axis of oscillation, substantially as described.

In witness whereof I have hereunto signed my name.

C. H. McCORMICK.

In presence of—

P. H. WATSON,

JOHN S. HOLLINGSHEAD.